Sept. 14, 1948.  N. E. RODGERS ET AL  2,449,144
METHOD OF PREPARING A VITAMIN CONCENTRATE
Filed Nov. 11, 1944  9 Sheets-Sheet 1

Inventors
Nelson E. Rodgers.
Henry L. Pollard.
Reginald E. Meade.
By The Firm of Charles M. Hill Attys.

Patented Sept. 14, 1948

2,449,144

UNITED STATES PATENT OFFICE

2,449,144

METHOD OF PREPARING A VITAMIN CONCENTRATE

Nelson E. Rodgers, Henry L. Pollard, and Reginald E. Meade, Appleton, Wis., assignors to Western Condensing Company, San Francisco, Calif., a corporation of California Application November 11, 1944, Serial No. 563,084

4 Claims. (Cl. 195—44)

This invention relates to processes for the manufacturing of biologically active materials such as vitamins by fermentation processes. More particularly, the invention pertains to the synthesis, from lactose containing products (in particular, lacteal material), of riboflavin and other vitamins by the action of bacteria, and, specifically, by the action of the bacterium *Clostridium acetobutylicum*.

The present application is a continuation-in-part of our application Serial No. 439,310, filed April 17, 1942 and entitled "Process for manufacturing a vitamin concentrate" (now issued as United States Patent No. 2,369,680).

The following paragraphs describe generally a fermentation process to the improvement of which the present invention is particularly directed.

As disclosed in our copending application, we have found that the natural riboflavin content of whey or skim milk may be increased to a considerable extent by subjecting whey or skim milk under controlled conditions to the fermenting action of *Clostridium acetobutylicum*. Such a fermentation synthesis of riboflavin is accompanied by the formation of neutral solvents such as ethanol, acetone and butanol and gases such as hydrogen and carbon dioxide, which can be recovered as valuable by-products.

To prepare a lactose containing lacteal medium such as whey or skim milk for fermentation to increase its riboflavin content, it is sterilized completely or substantially completely by heat treatment at about 250° F. for about 10 to 20 minutes. In addition, the acidity of the lacteal medium is neutralized preferably to a pH of 6 to 7 by adding an alkaline reagent such as sodium, potassium or calcium hydroxide. Calcium carbonate may be added to enhance riboflavin production. The iron content of the lacteal medium preferably is adjusted to within a range of about 0.5 to less than 4.5 parts per million.

In this connection it should be noted that the natural iron content of uncontaminated whey or skim milk will range from 0.10 to 0.21 part per million, while the iron content of whey contaminated, as by corrosive contact with iron containers, may reach a value above 4.5 parts per million. In the case of uncontaminated whey, the iron content may be adjusted upwardly by incorporation of suitable amounts of a soluble ferrous salt, while whey containing too much iron may be diluted with uncontaminated whey.

The thus prepared material, cooled to a temperature of about 100° F., is placed in a fermenting container and inoculated with *Clostridium acetobutylicum*, preferably at temperatures of about 100° F. under conditions such as will prevent the introduction of iron and contaminating organisms. A starter having a suitable volume for the batch to be fermented can be prepared from a stock culture by a series of transfers to a nutrient medium such as whey.

In general, fermentation can continue for from twelve to forty-eight hours, or until there is no noticeable further increase in riboflavin content.

The gases formed during fermentation can be vented from the fermenting tank as formed. The solvents formed during fermentation can be removed by fractional distillation, and after removing volatile products the fermented material can be concentrated by evaporation to produce a concentrated liquor. If desired, this liquor can be further subjected to drying to produce a powdered product.

If desired, instead of separately fractionating the solvents, they can be condensed from the vapors evolved during concentration of the fermented material by evaporation to form a water-solvent mixture from which the solvents can be removed by fractional distillation.

At some point after fermentation, it is desirable to inhibit further bacterial action, as for example by heat sterilization applied as a separate step or in conjunction with concentration by evaporation.

The product obtained by the above procedure is a concentrate which can be further refined or blended with various food materials for human or animal consumption. By use of the process described hereinabove, the riboflavin content of whey has been increased from about 1.4 to from 6 to 70 micrograms per milliliter (before concentration by evaporation), which corresponds to about 240 to 2800 micrograms per gram on a dried basis.

Some of the lactose is consumed in the fermenting process so that the final product contains a reduced amount of milk sugar, depending upon the extent of fermentation. The solids of the final product are the remaining solids of the whey or skim milk employed and therefore are available as food ingredients, which are used to advantage when the product is blended with other materials, such as various milk products, bread and bakery products, poultry and animal feeds, and the like.

The present invention pertains particularly to the preparation of an inoculum or starter for carrying out fermentation processes such as that described hereinabove.

For initiating fermentation, for instance, in a batch of about one thousand pounds of whey, an inoculum of from thirty to eighty pounds is usually required. Such a relatively large inoculum has to be built up from a relatively small culture derived from a stock culture maintained on sterile soil. The building up of a large inoculum from a small amount of stock culture may be carried out as follows: A suitable strain of *Clostridium acetobutylicum*, such as described by McCoy, Peterson and Hastings ("A Cultural Study of the Acetone Butyl Alcohol Organisms," Journal of Infectious Diseases, volume 39, page 457, 1926) is taken from soil stock, heat shocked in a sterile medium such as liver extract, and is then allowed to propagate. This material is then added to a batch of sterile whey or other nutrient, and, after permitting fermentation and bacterial growth, this material is used to inoculate a larger batch of sterile whey or other nutrient. Successive transfers can be made in this fashion until sufficient material is prepared for inoculating the main batch of material.

Frequently, *Clostridium acetobutylicum* tends to attenuate in its capacity to synthesize riboflavin when subjected to serial transfer, as in building up an inoculum. We have now found that the yield of riboflavin in the fermentation process described hereinabove can be greatly improved and rendered consistently high by careful control of the developmental history of the inoculum. More particularly, we have found that consistently good yields of riboflavin can be obtained by timing the intervals between the transfers of the cultures to coincide with the occurrence of certain acidity changes. Further, we have found that for best results the relation between time of inoculation and certain phases of the acidity cycle of the inoculum used for starting the final fermentation (main batch) should be controlled within narrower limits than those permissible in the preceding transfers in the series.

By proceeding according to the principles of the present invention, it is possible to maintain the riboflavin synthesizing properties of a culture of *Clostridium acetobutylicum* at a high level throughout a series of transfers used in developing an inoculum.

It is therefore an important object of the invention to provide a method for preparing inocula of *Clostridium acetobutylicum* bacteria to produce commercially sized batches which will induce riboflavin synthesis in lacteal materials.

Another important object of the present invention is to provide a method for preventing attenuation of the riboflavin synthesizing capacity of *Clostridium acetobutylicum* during the serial development of large inocula by so timing each transfer as to coincide with certain acidity changes occurring during the culture cycle.

Other and further objects and features of the present invention will become apparent from the following detailed description and appended claims.

Figures 1, 2:
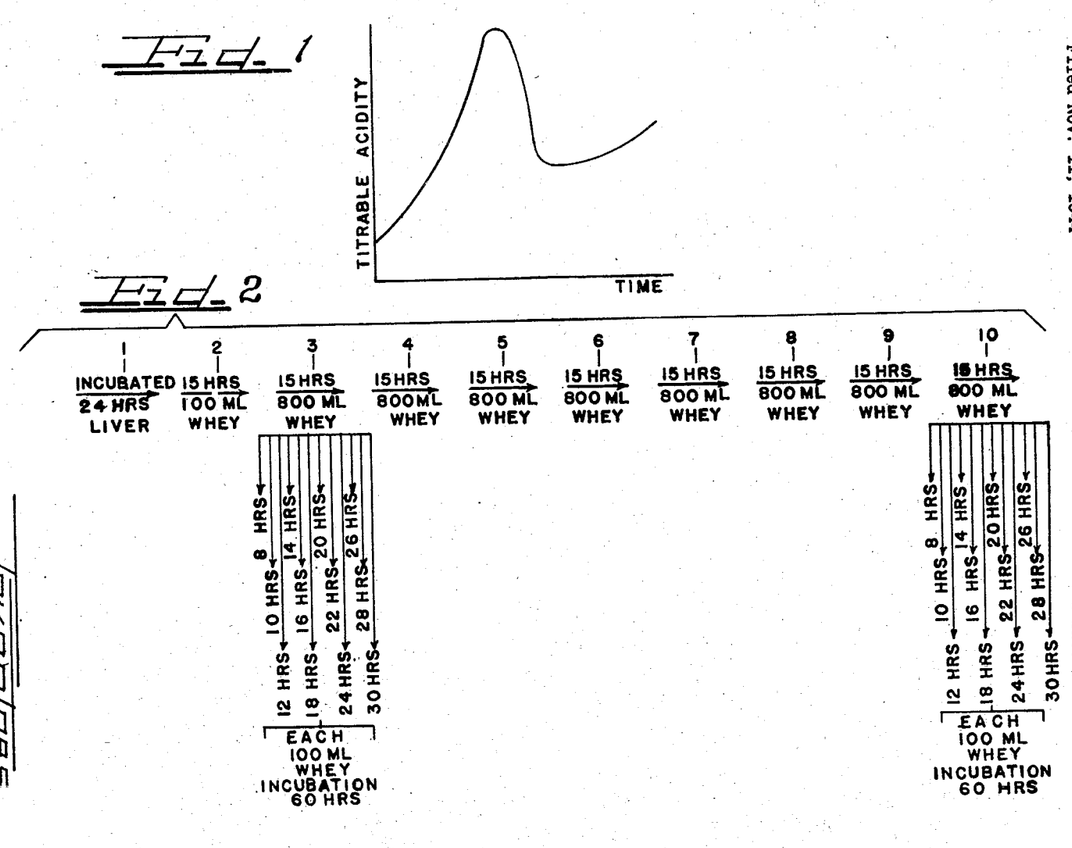
Figure 3:
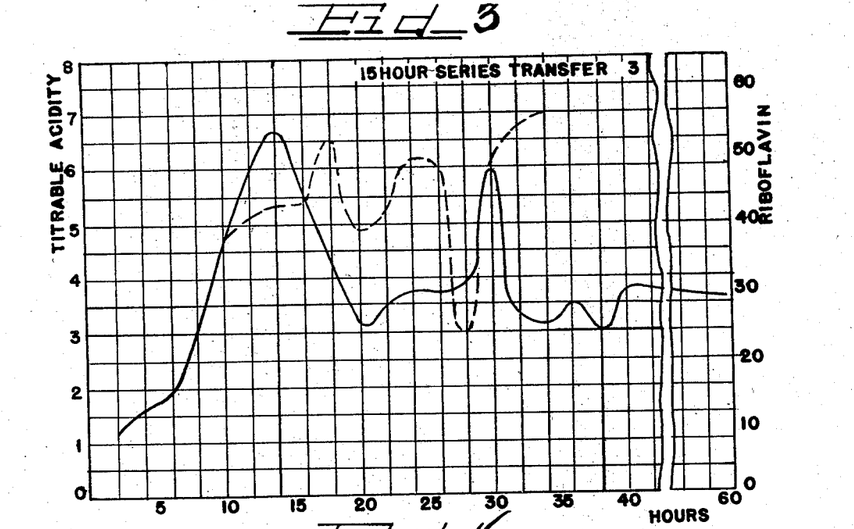
Figure 4:
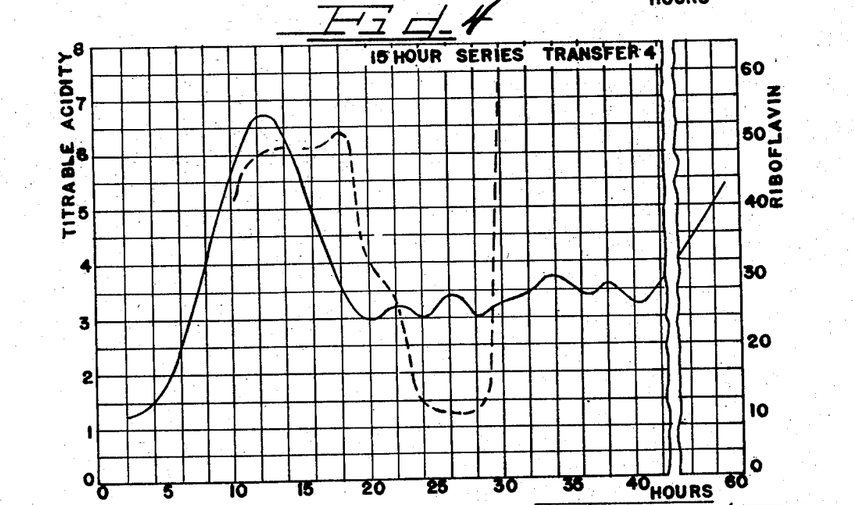
Figure 5:
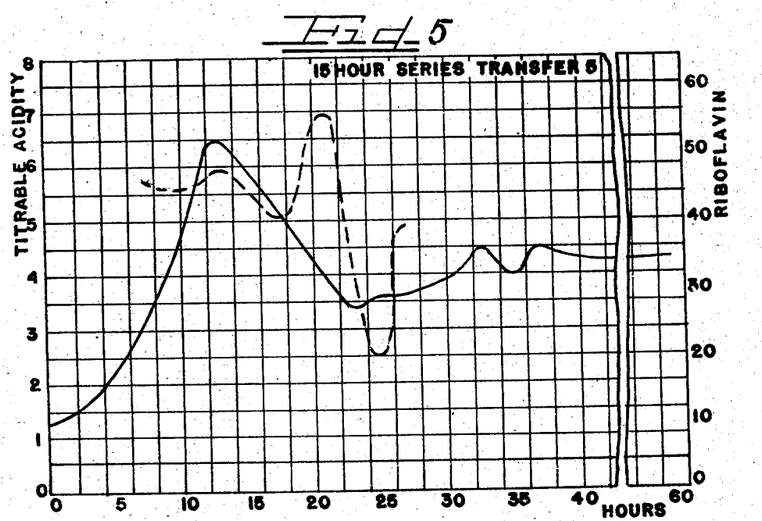
Figure 6:
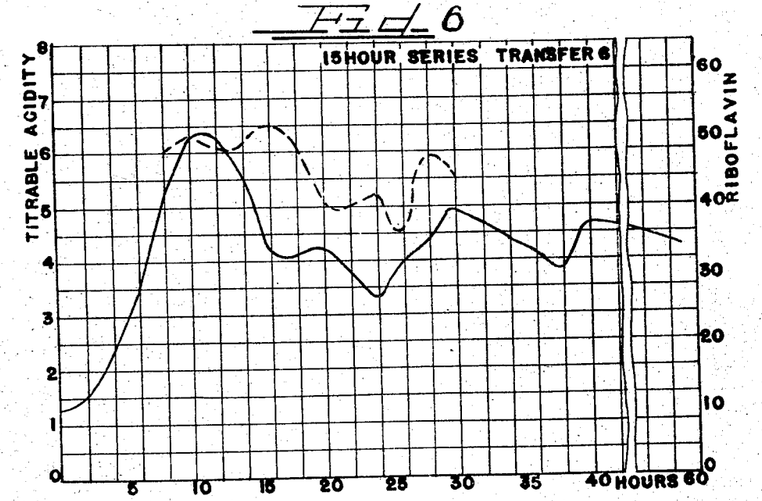
Figure 7:
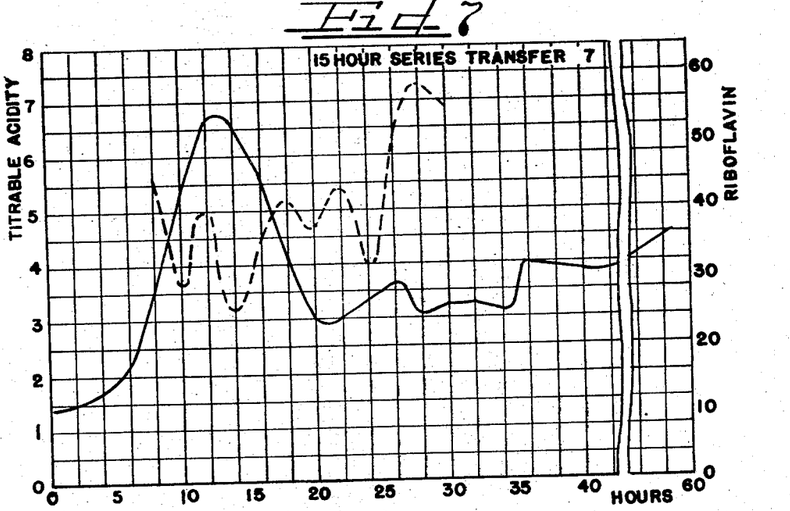
Figure 8:
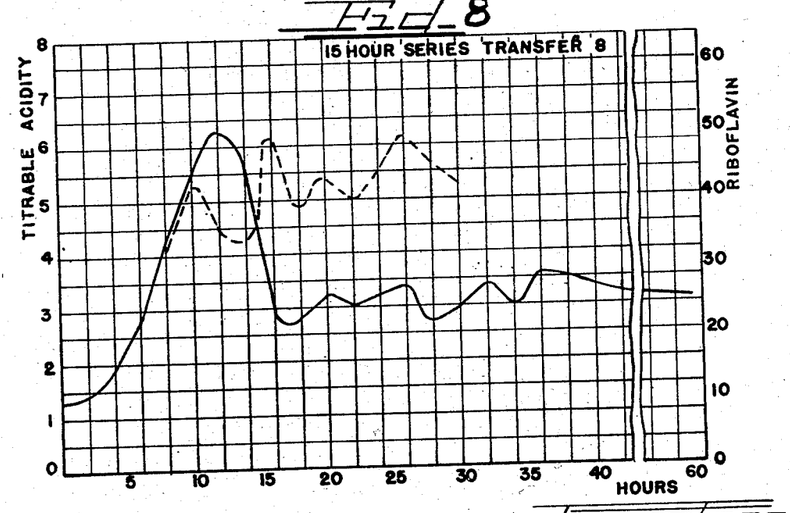
Figure 9:
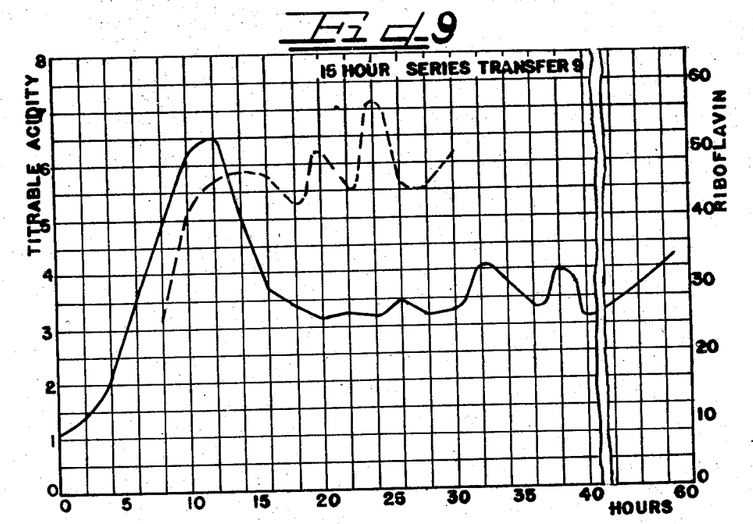
Figure 10:
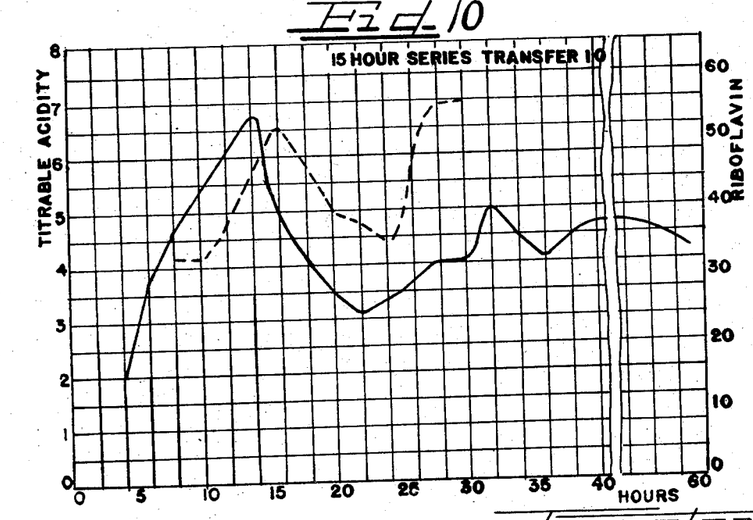
Figure 11:
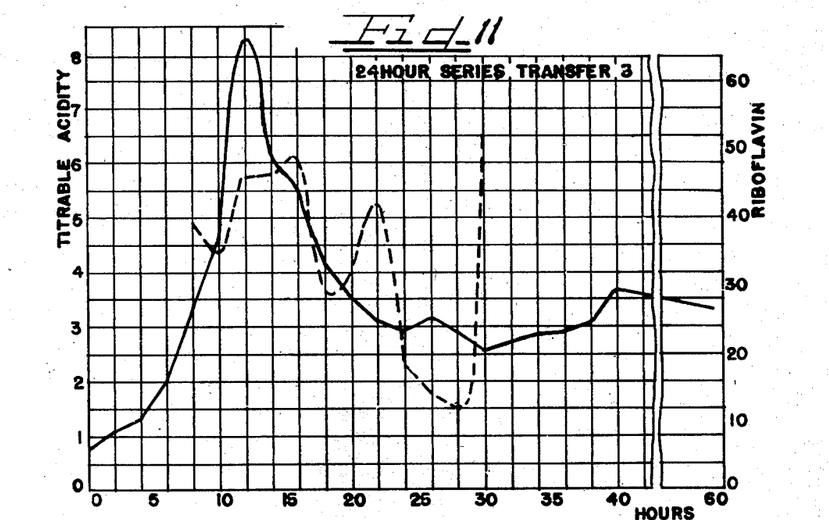
Figure 12:
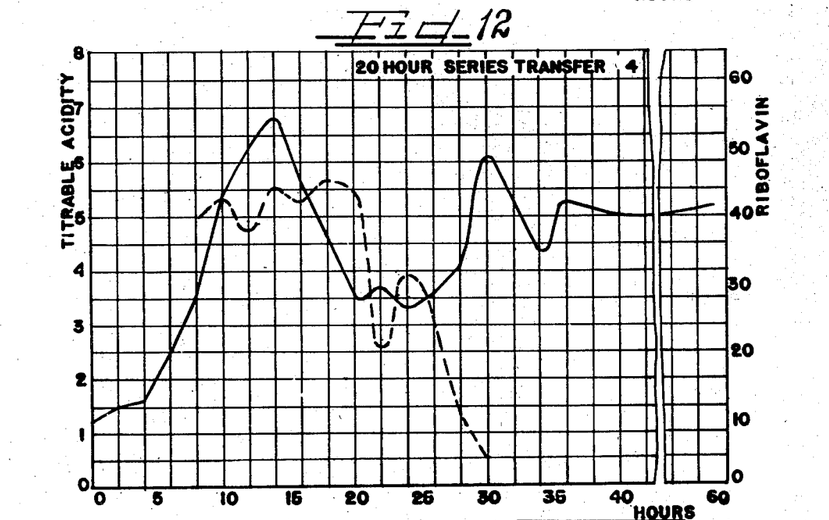
Figure 13:
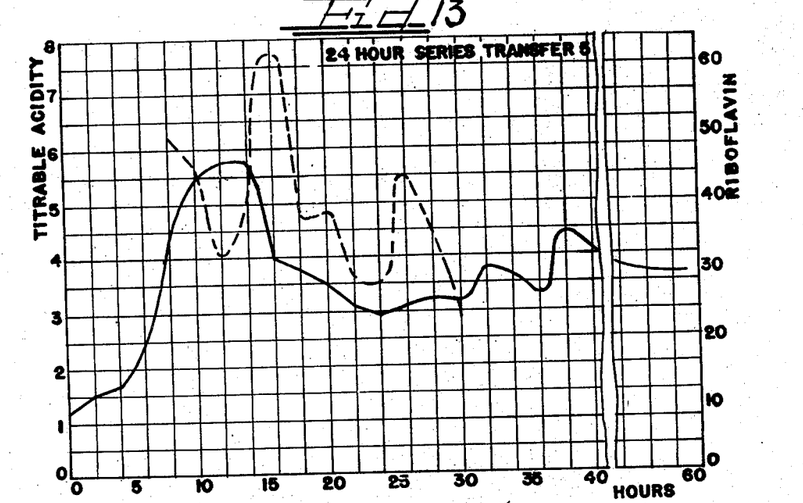
Figure 14:
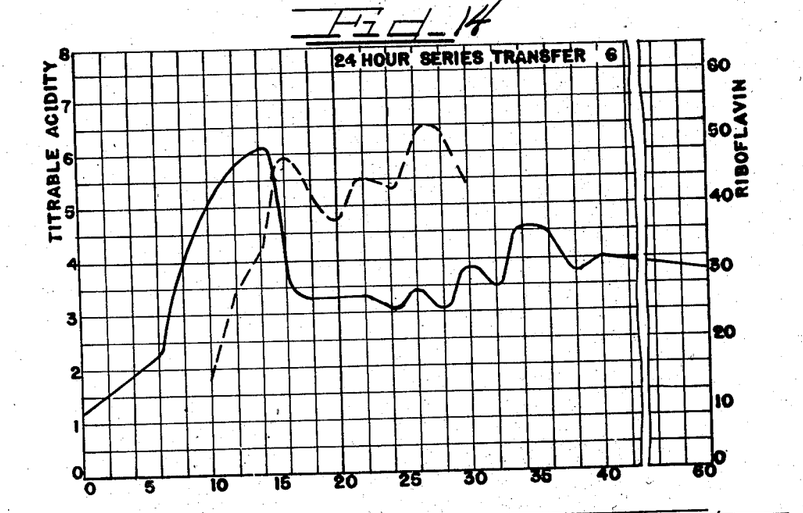
Figure 15:
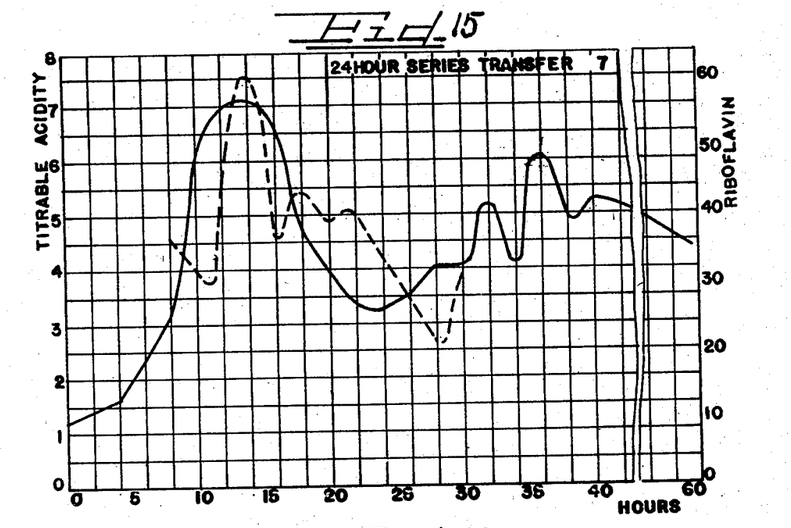
Figure 16:
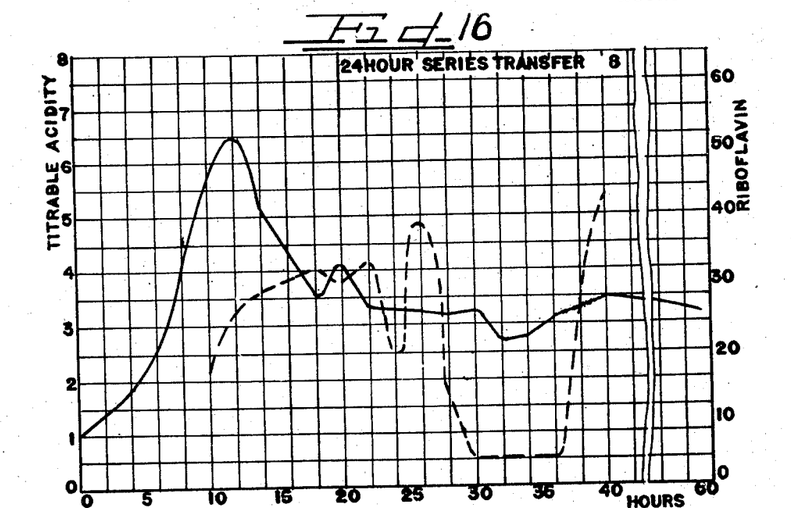
Figure 17:
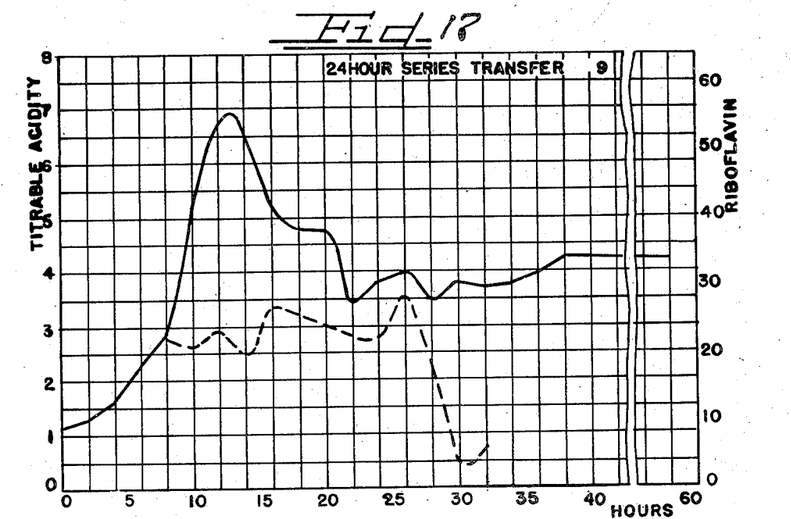
Figure 18:
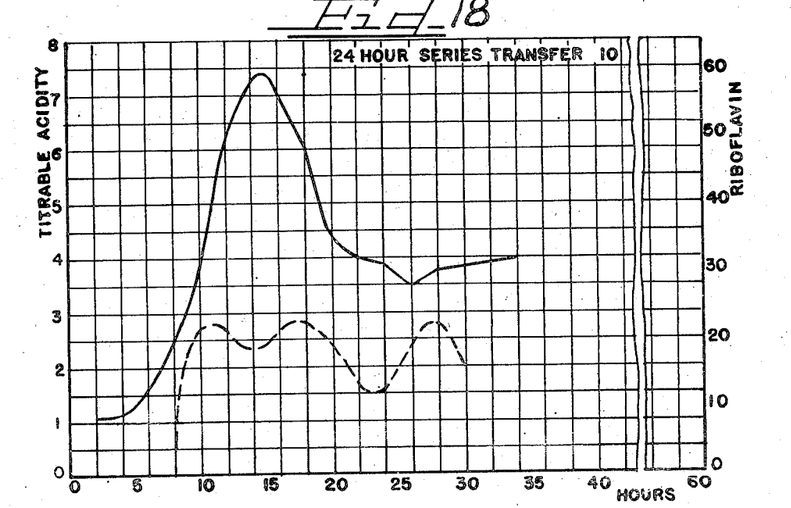

Reference is made to Figure 1 showing in simplified graphical form the relation between time and titratable acidity in whey being fermented with *Clostridium acetobutylicum*. By "titratable acidity" as used in the specification and claims we mean the number of milliliters of 0.10 normal sodium hydroxide required to neutralize to a phenolphthalein end-point ten milliliters of liquor that after being drawn has been heated in a test tube in a boiling water bath two minutes to expel the carbon dioxide. As shown in Figure 1, the titratable acidity rises to a maximum value (usually around 6 to 7 milliliters), then falls to a minimum level somewhat higher than the initial titratable acidity, and thereafter rises slowly (sometimes very irregularly) to values much below the maximum titratable acidity.

Maximum titratable acidity is usually reached in from eleven to seventeen hours of fermentation. The exact time required to reach maximum acidity may in certain instances be less than eleven hours or more than seventeen hours and, among other things, depends on the size of the inoculum.

In developing a commercially large inoculum according to the present invention, a small original culture is repeatedly transferred to successively larger quantities of nutrient medium. The resulting cultures are fermented before being transferred to additional amounts of nutrient medium. In carrying out such additions of nutrient medium and in carrying out the intervening incubation steps, three precautions are taken.

First, the fermentation from which a fresh medium is to be inoculated should be permitted to attain a titratable acidity of at least four milliliters before transfer. If this precaution is not observed proliferation of the bacteria may not be able to keep up with the dilution resulting from successive transfers employed in building up the inoculation, and consequently the final inoculum may be ineffective. Although it is undesirable to transfer an inoculum before a culture has attained a titratable acidity of four milliliters, yet, as explained hereinbelow, the transfer can be made at or somewhat beyond the time when the culture has reached maximum acidity.

The time at which a titratable acidity of four milliliters is reached will vary in an individual culture depending on the history and size of the inoculum, the nature of the medium, and other conditions. Ordinarily the time required to reach a titratable acidity of four milliliters is more than one-half the time required to reach maximum acidity. In order to determine the minimum time required for fermentation between transfer to additional medium, samples may be analyzed at suitable intervals.

The second precaution to be observed is that transfer of an inoculum should be carried out within five hours after maximum titratable acidity of the parent culture has been reached. Within limits, failure to observe this precaution does not lead to inadequate development of the bacterial population, as when inoculation is carried out before a titratable acidity of four milliliters has been reached, but leads to another undesirable result, viz., "attenuation" of the culture or partial loss of ability of the culture to support riboflavin synthesis when used as an inoculum. Such "attenuation" or decrease in ability to synthesize riboflavin becomes particularly apparent after six or seven transfers.

The third precaution relates to the fermentation carried out after the last transfer in building up the inoculum (whereby the culture is brought to the desired volume for use as an inoculum in a main batch of whey). We have found that immediately prior to the inoculation of the main batch, fermentation of the built-up culture should be continued from two to five hours after maximum titratable acidity has been reached. At that time the developed inoculum should be added to the main batch to be fermented.

The third precaution should be observed for the purpose of assuring consistently good yields of riboflavin in the main batch being fermented. Good yields and even very high yields of riboflavin may be obtained occasionally by fermenting the inoculum for shorter or longer periods than the time required to reach maximum titratable acidity plus from two to five hours, but such good or high yields are not obtained consistently; whereas, if the third precaution is observed, a good yield of riboflavin is reasonably certain.

Thus it will be seen that we have provided a method of developing, from a small, starting culture, a relatively much larger inoculum suitable for initiating fermentation in a large batch of whey, for instance, one of about one thousand pounds. For this purpose, we repeatedly transfer the culture to amounts of medium, preferably liver extract (for the first transfer) and whey (for the subsequent transfers), the total amount of the nutrient material being sufficient to increase the volume of the original culture to that of the desired inoculum.

Further, we ferment each culture (except the final one) of the transfer series used to build up the inoculum until a titratable acidity of at least four milliliters has been attained and no longer than from two to five hours after the maximum titratable acidity has been reached. On the other hand, the final culture of the series, which is used to inoculate the main batch, is allowed to ferment for from two to five hours after the time of maximum acidity. Thus, each transfer used in developing the final inoculum is timed to correspond with a definite stage of the physiological development of each parent culture. Likewise the final inoculum is transferred at a definite cultural phase in which the physiological condition of the micro organisms is such as to induce good riboflavin production in the main fermentation.

It should be emphasized that, according to our process, the schedules of inoculum transfer are based on "physiological age" relationships and are not controlled by "clock time" age. The various physiological phase characteristics of this fermentation may, and frequently do, occur at varying times. Consequently, it is our practice to ignore "clock time" schedules and to relate our procedures to the physiological cycle of the culture, as indexed by titratable acidity.

In general, the ratio between the nutrient medium added and the culture being transferred may be about twenty-five to one. With such a ratio, some six transfers ordinarily suffice for building up a starter of suitable volume. More than ten transfers are not usually resorted to, since attenuation sometimes occurs with more than ten transfers, even when the above disclosed precautions are observed.

As pointed out hereinabove, failure to observe the above disclosed precautions is not necessarily fatal, since good and even very high yields may sometimes be obtained in spite of such failure. Where a number of transfers are involved, as is usually the case, failure to continue fermentation for the time indicated before one of the transfers is not so likely to effect unsatisfactory results as when the time limits are not observed for all of said transfers. The methods disclosed and claimed in this application are based on data obtained in a large number of experiments and are intended to insure consistently good yields in a large number of fermentations, as in commercial production of riboflavin from whey.

The application of the principles of this invention is illustrated by the following example showing the preparation of two inocula carried out with repeated transfers at fifteen and twenty-four hour intervals. The experiment carried out with transfers at fifteen hour intervals is selected as illustrative for the reason that in this instance, the fifteen hour interval always happened to fall within the presently disclosed physiological time limits. The experiment carried out with transfers at twenty-four hour intervals was chosen for the reason that, in this case, the twenty-four hour interval always happened to fall outside the presently claimed physiological time limits. It should be clearly understood, however, that under some conditions a series of transfers at fifteen hour intervals may fall outside the presently claimed physiological time limits. Ordinarily, however, a series of transfers at twenty-four hour intervals does not come within the scope of the present invention.

In the experiment described hereinbelow, the cultures were inoculated at 100° F. and a 4% inoculum was employed throughout. The whey medium was supplemented with 0.2% calcium carbonate, 10 parts per billion of para-amino benzoic acid, zinc sulfate equivalent to 1.2 parts per million of zinc, and ferrous sulfate equivalent to an iron concentration of 1.4 parts per million. The medium was sterilized by autoclaving for 10 minutes at a steam pressure of 15 pounds per square inch.

Both the fifteen and twenty-four hour series were started from the same soil stock. The fifteen hour transfer series was carried out as follows: A liver extract medium inoculated from a soil stock was heat-shocked and incubated for twenty-four hours. One hundred milliliters of whey medium was then inoculated from the liver culture and, after being incubated for fifteen hours, was used to inoculate eight hundred milliliters of whey. Subsequent transfers were made in eight hundred milliliters of whey at fifteen hour intervals. The twenty-four hour series was operated in the same manner, except that the transfers were made at twenty-four hour intervals. These transfers are hereinbelow referred to as "primary transfers" and correspond to the transfers used in building up a commercial size inoculum from a small stock culture.

The incubation period of twenty-four hours in the liver extract carried out in the fifteen hour series actually does not involve a twenty-four hour period of growth or proliferation, since the soil stock contained spores rather than vegetative cells. Growth or proliferation is not initiated at once on the inoculation of the liver extract, while the reverse is true in the subsequent inoculations of whey.

The course of each of the "primary fermentations," with the exception of the first and second, in each series was followed by determinations of titratable acidity.

Subcultures in bottles containing one hundred milliliters of medium (designated as "secondary cultures or transfers") were made from all, except the first and second primary cultures, beginning at eight hours and continuing at two hour intervals through thirty hours. Riboflavin yields were determined on the secondary cultures after sixty hours of incubation. These secondary fermentations correspond to the fermentations carried out in commercial production of riboflavin from whey. The intervals of from 8 to 30 hours at which the secondary cultures were started from their respective parent cultures correspond to the inoculum aging procedure carried out in commercial riboflavin manufacture.

Figure 2 illustrates schematically the transfers and fermentations carried out in the fifteen hour series. The ten primary transfers are designated by the numbers arranged horizontally along the top of the chart. Below each of these numbers the fermentation interval between each transfer is indicated together with the type and amount of nutrient to which the transfer is effected. The vertical lines indicate the secondary transfers made from all, except the first and second primary fermentations, at two hour intervals beginning at eight hours and ending at thirty hours. Only the secondary transfers for the third and last primary fermentations are illustrated, but the same procedure was followed for each intermediate primary fermentation.

In the appended drawings, Figures 3 to 18 show graphically the results obtained starting with the third primary transfer in the fifteen hour and twenty-four hour primary transfer series. Each of these figures contain legends identifying the transfer series and the transfer number. In each figure, the continuous line shows the variations in titratable acidity with time during the course of each primary fermentation; the broken line shows the yield of riboflavin obtained after sixty hours incubation of the secondary cultures. The titratable acidity phases of the primary cultures are shown on the same graphs.

These graphs do not illustrate the results of failure to continue primary fermentation until a titratable acidity of at least four milliliters has been reached, since the result can be as clearly disclosed by language as by graphs. The result of developing the inoculum by excessively prolonging the primary fermentation (for periods longer than five hours after maximum titratable acidity has been reached) is shown particularly in Figures 16, 17 and 18, where attenuation was evidenced by a marked drop in riboflavin yields in the secondary fermentations. This is in contrast to the fifteen hour series in which the yields were consistently higher and attain higher maximum values (Figures 3 to 10).

As for the time of inoculation of secondary fermentations, it will be noted that in only one instance (the fifth transfer in the fifteen hour series) did the first post maximum acidity peak in secondary riboflavin production fall outside the claimed inoculation time limits of from two to five hours after maximum titratable acidity in the primary culture had been reached. The curves of secondary riboflavin yield show cyclic variations and a number of peaks. The preferred time limits for inoculation of secondary fermentations include the first of said cyclic peaks occurring after the time of maximum acidity. This peak value is the only one consistently correlated with maximum titratable acidity. The other peak yields are so unpredictable that no general rule can be formulated for so manipulating the inoculum as to attain any one of these other peaks of riboflavin production with a satisfactory degree of certainty. In other words, these other peak values of riboflavin production are not reproducible to nearly the same extent as are the consistently good riboflavin yields obtainable when proceeding according to the methods of the present invention.

Many details of procedure and composition may be varied within a wide range without departing from the principles of this invention and it is therefore not our purpose to limit the patent granted on this application otherwise than necessitated by the scope of the appended claims.

We claim as our invention:

1. In a fermentation process for the manufacture of a vitamin concentrate including riboflavin by inoculating a sterile lactose containing lacteal material with a culture of *Clostridium acetobutylicum* developed from a stock culture by successive transfers to increasingly larger amounts of medium until a sufficiently large inoculum has been obtained, the improvement comprising incubating each culture of the series before transfer to a larger volume of medium until said culture has attained a titratable acidity of at least four milliliters of tenth normal acid per ten milliliters and not longer than five hours after the titratable acidity of said culture has reached its maximum value, after the last transfer continuing incubation of the resulting culture for from two to five hours after the titratable acidity of said last mentioned culture has reached its maximum value and then transferring the culture to said sterile lactose-containing material for initiating fermentation therein.

2. In a fermentation process for the manufacture of a vitamin concentrate including riboflavin by inoculating a sterile whey with a culture of *Clostridium acetobutylicum* developed from a stock culture by successive transfers to increasingly larger amounts of medium until a sufficiently large inoculum has been obtained, the improvement comprising incubating each culture of the series before transfer to a larger volume of medium until said culture has attained a titratable acidity of at least four milliliters of tenth normal acid per ten milliliters and not longer than five hours after the titratable acidity of said culture has reached its maximum value, after the last transfer continuing incubation of the resulting culture for from two to five hours after the titratable acidity of said last mentioned culture has reached its maximum value and then transferring the culture to said sterile whey for initiating fermentation therein.

3. A fermentation method for synthesizing riboflavin from sterile whey which comprises providing a *Clostridium acetobutylicum* culture, providing quantities of nutrient media, successively combining said culture with said quantities of nutrient media, incubating the resulting culture-nutrient medium mixtures, said incubations being continued prior to each combining step at least until each mixture has reached a titratable acidity of four milliliters and not longer than five hours past the time at which said mixtures have reached their maximum titratable acidities, the incubation of the mixture resulting from the last combining step being continued for from two to five hours past the time at which the last mentioned mixture has reached its maximum titratable acidity, and inoculating said whey with said mixture after the last incubation.

4. The process of synthesizing riboflavin from sterile whey which comprises inoculating a liver extract with *Clostridium acetobutylicum*, incubating the resulting culture, successively combining said culture with quantities of sterile whey, incubating the resulting culture-whey mixtures until each mixture has reached a titratable acidity of at least four milliliters of tenth normal acid per ten milliliters and not longer than five hours beyond the time the mixtures have reached their maximum titratable acidities, continuing the incubation of the mixture resulting from the last combining step for from two to five hours past the time at which the last mentioned mixture has reached its maximum titratable acidity, and inoculating a sterile whey with said mixture after the last incubation.

NELSON E. RODGERS.
HENRY L. POLLARD.
REGINALD E. MEADE.

REFERENCES CITED

The following references are of record in the file of this patent:

UNITED STATES PATENTS

| Number | Name | Date |
| --- | --- | --- |
| 1,911,411 | Viljoen | May 30, 1933 |
| 1,917,283 | Wroten | July 11, 1933 |

OTHER REFERENCES

Killeffer, Indus. and Eng. Chem. (1927), 19, #1, page 48.

Henrici, The Biology of Bacteria, Heath, 1934, page 148.

W. H. Peterson and E. B. Fred, "Butyl-Acetone Fermentation of Corn Meal."

"Industrial & Engineering Chemistry" (pages 237–242). Feb., 1932.